United States Patent
Garg et al.

(10) Patent No.: US 9,088,941 B2
(45) Date of Patent: Jul. 21, 2015

(54) WIRELESS COMMUNICATION APPARATUS AND METHOD

(71) Applicants: Arvind Garg, Noida (IN); Somvir Dahiya, Noida (IN); Sachin Jain, New Delhi (IN); Arvind Kaushik, Ghaziabad (IN); Arindam Sinha, Noida (IN)

(72) Inventors: Arvind Garg, Noida (IN); Somvir Dahiya, Noida (IN); Sachin Jain, New Delhi (IN); Arvind Kaushik, Ghaziabad (IN); Arindam Sinha, Noida (IN)

(73) Assignee: FREESCALE SEMICONDUCTOR,INC, Austin, TX (US)

( * ) Notice: Subject to any disclaimer, the term of this patent is extended or adjusted under 35 U.S.C. 154(b) by 236 days.

(21) Appl. No.: 13/938,248

(22) Filed: Jul. 10, 2013

(65) Prior Publication Data
US 2015/0016445 A1 Jan. 15, 2015

(51) Int. Cl.
*H04W 56/00* (2009.01)
*H04L 12/863* (2013.01)

(52) U.S. Cl.
CPC ........... *H04W 56/001* (2013.01); *H04L 47/622* (2013.01)

(58) Field of Classification Search
None
See application file for complete search history.

(56) References Cited

U.S. PATENT DOCUMENTS

| 7,577,779 | B2 | 8/2009 | Hayem |
| 7,656,897 | B2 | 2/2010 | Liu |
| 2010/0246487 | A1* | 9/2010 | Aoyama et al. ............... 370/328 |
| 2011/0237178 | A1 | 9/2011 | Seki |
| 2013/0051329 | A1* | 2/2013 | Take ............................ 370/328 |

* cited by examiner

*Primary Examiner* — Minh-Trang Nguyen
(74) *Attorney, Agent, or Firm* — Charles Bergere

(57) ABSTRACT

A transmission node for use in a wireless communication network includes a first CPRI unit for transmitting auxiliary data to a second CPRI unit in the transmission node. A memory unit stores control word data of the auxiliary data. A memory write block is connected between the first CPRI unit and the memory unit for writing the control word data to the memory unit based on a first set of frame timing signals received from the first CPRI unit. A memory read and merge block is connected to the memory unit for reading the control word data stored in the memory unit based on a second set of frame timing signals, merging the control word data with IQ data, and transmitting the merged auxiliary data to the second CPRI unit.

12 Claims, 3 Drawing Sheets

WIRELESS COMMUNICATION APPARATUS AND METHOD

BACKGROUND OF THE INVENTION

The present invention relates to a wireless communication method and apparatus, more particularly, to a method of synchronizing and forwarding control information between two adjacent nodes in an uplink path of a system having a daisy chain via Common Public Radio Interface (CPRI).

CPRI is an industry standard aimed at defining a specification for the interface of base stations between Radio Equipment Controllers (REC) and Radio Equipment (RE). FIG. 1 shows a topology of a chain 100 including several nodes (102a-102d) connected via the CPRI interface. Node 102a is a REC node, node 102d is a RE node, nodes 102b and 102c can be either a REC node or a RE node. As shown in the node 102b, in order to support a CPRI daisy chain configuration, each node has a pair of CPRI units 104a and 104b connected through their auxiliary interfaces 106a and 106b. The chain 100 can be located in one transmission node, e.g., an eNodeB or a relay node, or across more than one transmission node.

In downlink transmission, a timing flow 108 including sync word, basic frame number and hyper frame number is propagated across the chain 100 and a downlink data flow 110, including IQ data and control words, follows the time flow 108, whereas in uplink transmission, the timing flow 108 is transmitted from one node to another in a point to point fashion, and an uplink data flow 112, including IQ data and control words, does not follow the timing flow 108 when being transmitted from one CPRI unit to another CPRI unit within one REC or RE node. Therefore, e.g., in the REC or RE node 102b, there is a timing difference between the two CPRI units 104a and 104b in uplink transmission, which causes a problem to seamlessly forward the control words coming from the downlink node 102c to the uplink node 102a.

It is therefore desirable to synchronize the control words with the timing flow in uplink transmission before forwarding the control words to the next node in the chain.

BRIEF DESCRIPTION OF THE DRAWINGS

The invention, together with objects and advantages thereof, may best be understood by reference to the following description of preferred embodiments together with the accompanying drawings in which.

DETAILED DESCRIPTION OF PREFERRED EMBODIMENTS

Figure 1:
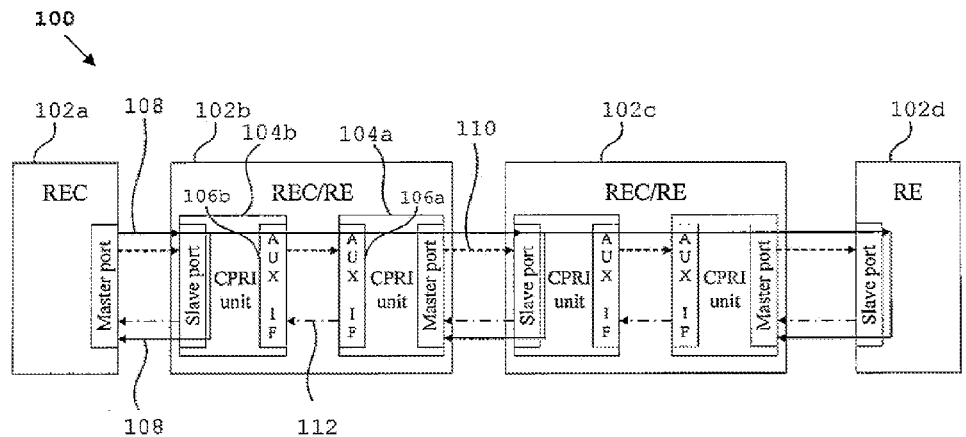
FIG. 1 is a schematic block diagram showing a topology of a chain including several nodes connected via CPRI interface.

The detailed description set forth below in connection with the appended drawings is intended as a description of presently preferred embodiments of the invention, and is not intended to represent the only forms in which the present invention may be practised. It is to be understood that the same or equivalent functions may be accomplished by different embodiments that are intended to be encompassed within the spirit and scope of the invention. In the drawings, like numerals are used to indicate like elements throughout. Furthermore, terms "comprises," "comprising," or any other variation thereof, are intended to cover a non-exclusive inclusion, such that module, circuit, device components, structures and method steps that comprises a list of elements or steps does not include only those elements but may include other elements or steps not expressly listed or inherent to such module, circuit, device components or steps. An element or step proceeded by "comprises . . . a" does not, without more constraints, preclude the existence of additional identical elements or steps that comprises the element or step.

In one embodiment, the present invention provides a transmission node for use in a chain in a wireless communication network. The transmission node includes a first CPRI unit having a first auxiliary interface for transmitting auxiliary data to a second CPRI unit in the transmission node, wherein the auxiliary data comprises control word data and IQ data. The transmission node further includes a memory unit for storing the control word data, a memory write block connected between the first auxiliary interface and the memory unit for writing the control word data to the memory unit based on a first set of frame timing signals received from the first auxiliary interface, and a memory read and merge block connected to the memory unit for reading the control word data stored in the memory unit based on a second set of frame timing signals, and merging the control word data with the IQ data from the first auxiliary interface, wherein the second CPRI unit comprises a second auxiliary interface connected to the memory read and merge block for receiving the merged auxiliary data.

In another embodiment, the present invention provides a method of operating a transmission node for use in a chain in a wireless communication network. The method includes writing control word data in auxiliary data transmitted from a first auxiliary interface of a first CPRI unit to a memory unit based on a first set of frame timing signals received from the first auxiliary interface, wherein the auxiliary data comprises the control word data and IQ data. The method further includes reading the control word data stored in the memory unit based on a second set of frame timing signals received from a second auxiliary interface of a second CPRI unit in the transmission node, merging the control word data read from the memory unit with the IQ data received from the first auxiliary interface, and transmitting the merged auxiliary data to the second auxiliary interface.

Figure 2:
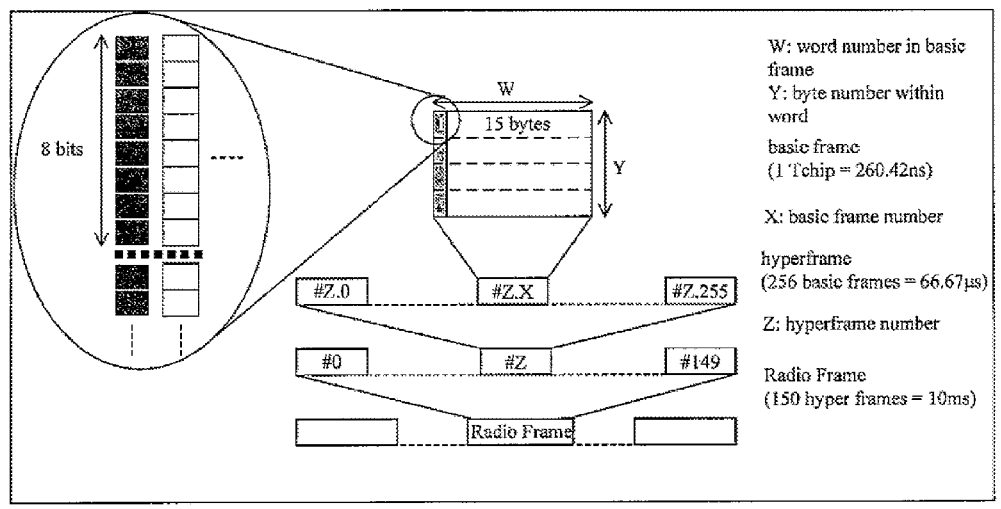
FIG. 2 shows the frame hierarchy and notation indices for the CPRI protocol.

Referring now to FIG. 2, a schematic diagram illustrating the frame hierarchy and notation indices in the CPRI protocol. A basic frame has 16 words, indexed with W=0 . . . 15; 256 time division multiplexed basic frames, indexed with X=0 . . . 255, form a hyperframe; and 150 hyperframes, indexed with Z=0 . . . 149, for a radio frame. The radio frame is a frame to be transmitted and received over a radio area (cell or sector) provided by a RE node or a REC node. The duration of a basic frame is about 260.4 ns. Therefore, the duration of a radio frame is 10 ms.

As mentioned above, a basic frame has 16 words, W=0 . . . 15. The word at index W=0 is used for a control word, and the remaining words (W=1 . . . 15) are dedicated to the U-plane In-Phase and quadrature-phase (IQ) data transport (IQ data block). The length of the control word data depends on the CPRI link rate. In the basic frame, each byte (8 bits) within a word is addressed with an index Y. Therefore, at the minimum CPRI link rate of 614.4 Mb/s, Y=0, which means that there are 128 bits in a basic frame, out of which 8 bits are for the control word data and the remaining 120 bits are IQ data bits, while at the maximum CPRI link rate of 9830.4

Mb/s, Y=0 . . . 15, which means that there are a total of 2048 bits in a basic frame, out of which 128 bits are for control word data and the remaining 1920 bits are IQ data bits. At maximum CPRI link rate of 9830.4 Mb/s, there are a total of 32768 bits for control word data in a hyperframe.

Figure 3:
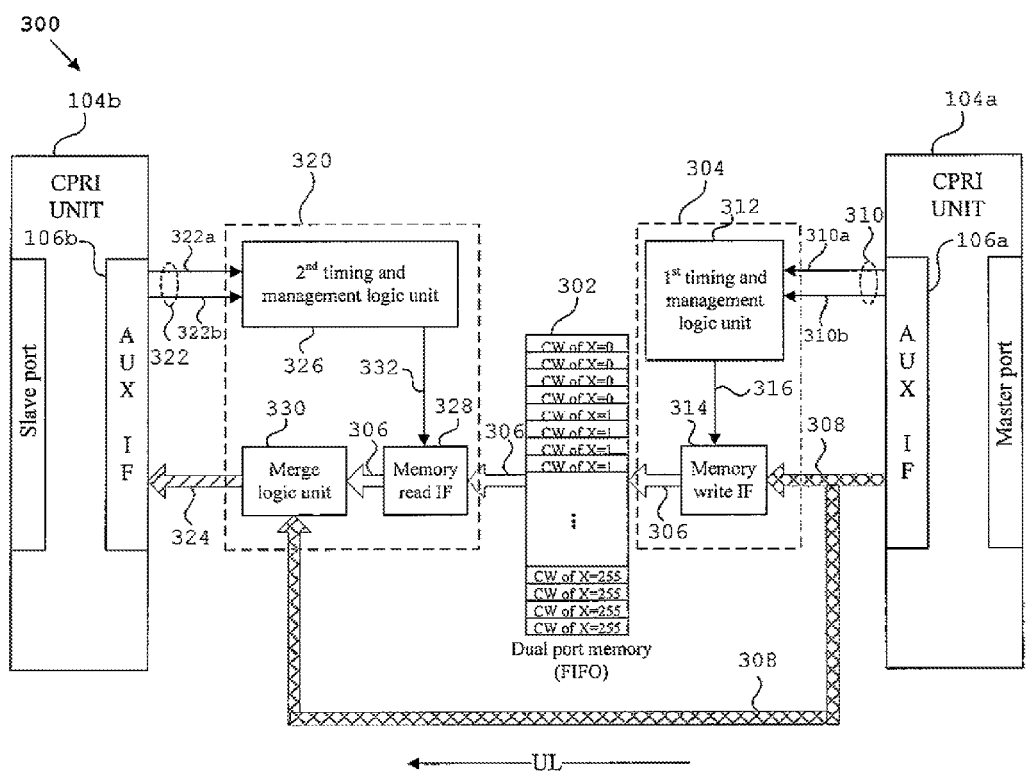
FIG. 3 is a schematic block diagram of a RE/REC node in accordance with an embodiment of the invention.

Referring to FIG. 3, in accordance with an embodiment of the invention, a RE/REC node 300 comprises a first CPRI unit 104a and a second CPRI unit 104b. The first CPRI unit 104a has a first auxiliary interface 106a for transmitting auxiliary data to a second auxiliary interface 106b of the second CPRI unit 104b. The auxiliary data comprises control word data and IQ data. The RE/REC node 300 further includes a memory unit 302 for storing the control word data. For example, the memory unit 302 is a buffering First-Input-First-Output (FIFO) of size 256×128 or 1024×32 to hold the incoming control word data from the first CPRI unit 104a, therefore the FIFO is deep enough to store all the control word data in one hyperframe at maximum CPRI link rate of 9830.4 Mb/s. The memory unit 302 can be a part of a memory of the RE/REC node 300, e.g., ROM, RAM or flash memory.

A memory write block 304 is connected between the first auxiliary interface 106a and the memory unit 302 for writing the control word data 306 in the original auxiliary data 308 received from the first auxiliary interface 106a to the memory unit 302 based on a first set of frame timing signals 310 received from the first auxiliary interface 106a.

In a preferred embodiment, the memory write block 304 comprises a first timing and management logic unit 312 connected to the first auxiliary interface 106a and a memory write interface 314 connected to the first timing and management logic unit 312, the first auxiliary interface 106a, and the memory unit 302.

The first timing and management logic unit 312 receives the first set of frame timing signals 310 from the first auxiliary interface 106a and generating a memory write signal 316 based on the first set of frame timing signals 310.

In a preferred embodiment, the first set of frame timing signals 310 comprises a first synchronization status signal 310a for indicating that the first CPRI unit 104a has synchronized up to a downlink node in the chain 100, and a first segment number 310b indicating the number of a current segment in the first CPRI unit 104a for detecting the control word data in the auxiliary data.

The segment is a chunk of bits in the basic frame with a certain length. For example, the segment is defined with a length of 32 bits, therefore there are 64 segments in a basic frame at maximum CPRI link rate of 9830.4 Mb/s, among which the first 4 segments are control word data and the rest 60 segments are IQ data. The first segment number starts from 1, the CPRI unit 104a keeps count of the segment numbers and provides the first segment number 310b to the first timing and management logic unit 312.

The first timing and management logic unit 312 instructs the memory write interface 314 to write the control data 306 to the memory unit 302 with the memory write signal 316 when the first CPRI unit 104a has synchronized with the downlink node in the chain 100, and the control word data 306 in the original auxiliary data 308 in the first CPRI unit 104a has been detected. In a preferred embodiment, the control word data 306 is detected by comparing the first segment number 310b with a predefined segment number. The predefined segment number is set as the number of segments in control word data in a basic frame, therefore if the first segment number 310b is less than or equal to the predefined segment number, the current data is control word data. The first timing and management logic unit 312 can be a part of a processor of the RE/REC node 300, or a hardware block comprising a first comparator for comparing the first segment number 310b with the predefined segment number and a gate for gating an output signal of the first comparator and the first synchronization status signal.

The memory write interface 314 writes the control word data 306 to the memory unit 302 based on the memory write signal 316 received from the first timing and management logic unit 312. The memory write interface 314 can be a part of a processor of the RE/REC node 300.

The RE/REC node 300 further comprises a memory read and merge block 320 connected between the second auxiliary interface 106b of the second CPRI unit 104b and the memory unit 302 for reading the control word data 306 stored in the memory unit 302 based on a second set of frame timing signals 322, merging the control word data with the IQ data in the original auxiliary data 306 from the first auxiliary interface 106a, and providing the merged final auxiliary data 324 to the second auxiliary interface 106b.

In a preferred embodiment, the memory read and merge block 314 comprises a second timing and management logic unit 326 connected to the second auxiliary interface 106b, a memory read interface 328 connected between the second timing and management logic unit 326 and the memory unit 302, and a merge logic unit 330 connected to the memory read interface 328, the first auxiliary interface 106a, and the second auxiliary interface 106b.

The second timing and management logic unit 326 receives the second set of frame timing signals 322 from the second auxiliary interface 106b and generates a memory read signal 332 based on the second set of frame timing signals 322.

In a preferred embodiment, the second set of frame timing signals 322 comprises a second synchronization status signal 322a for indicating that the second CPRI unit 104b has synchronized with the uplink node in the chain 100, and a second segment number 322b indicating the number of the current segment in the second CPRI unit 104b for detecting the control word data in the merged final auxiliary data 324.

The second timing and management logic unit 326 instructs the memory read interface 328 to read the control data 306 from the memory unit 302 with the memory read signal 332 when the second CPRI unit 104b has synchronized with the uplink node in the chain 100, and the control word data in the auxiliary data in the second CPRI unit 104b has been detected. In a preferred embodiment, the control word data is detected by comparing the second segment number 322b with the predefined segment number. If the second segment number 322b is less than or equal to the predefined segment number, the current data is the control word data.

The second timing and management logic unit 326 can be a part of a processor of the RE/REC node 300, or a hardware block comprising a second comparator for comparing the second segment number 322b with the predefined segment number and a gate for gating an output signal of the second comparator and the second synchronization status signal.

The memory read interface 328 reads the control word data 306 stored in the memory unit 302 based on the memory read signal 332 received from the second timing and management logic unit 326. The memory read interface 328 can be a part of a processor of the RE/REC node 300.

The merge logic unit 330 merges the control word data 306 from the memory read interface 328 with the IQ data in the original auxiliary data 306 from the first auxiliary interface 106a, and transmitting the merged final auxiliary data 324 to the second auxiliary interface 106b.

Figure 4:
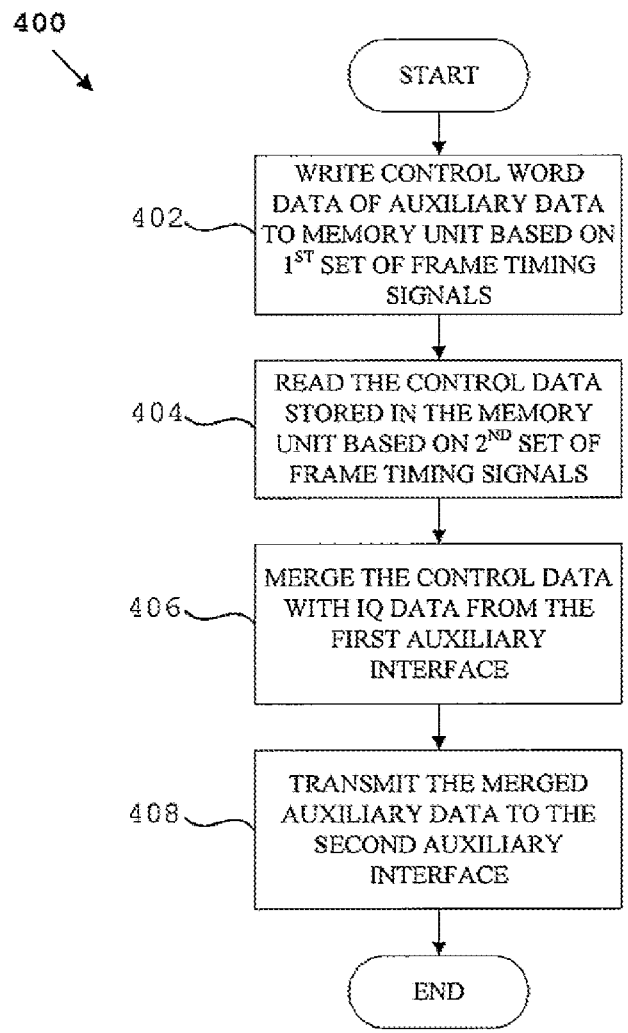
FIG. 4 is a flow chart illustrating a method of synchronizing and forwarding control information between two adjacent nodes connected in a chain via a CPRI unit in accordance with an embodiment of the present invention.

FIG. 4 is a flow chart illustrating a method 400 for synchronizing and forwarding control word data between two adjacent nodes in an uplink path of a system having a daisy chain via CPRI.

The method 400 starts at step 402 by writing the control word data in auxiliary data transmitted from a first auxiliary interface of a first CPRI unit to a memory unit based on a first set of frame timing signals received from the first auxiliary interface, wherein the auxiliary data comprises the control word data and IQ data, as discussed in FIG. 2.

In a preferred embodiment, the memory unit is a buffering First-Input-First-Output (FIFO) of size 256×128 or 1024×32 to hold the incoming control word data from the first CPRI unit, therefore the FIFO is deep enough to store all the control word data in one hyperframe at maximum CPRI link rate of 9830.4 Mb/s. The memory unit can be a part of a memory of the RE/REC node, e.g., ROM, RAM or flash memory.

In a preferred embodiment, a memory write signal is generated based on the first set of frame timing signals to instruct writing the control word data to the memory unit.

In a preferred embodiment, the first set of frame timing signals comprises a first synchronization status signal for indicating that the first CPRI unit has synchronized up to a downlink node in the chain, and a first segment number indicating the number of the current segment in the first CPRI unit for detecting the control word data in the auxiliary data.

The segment is a chunk of bits in the basic frame with a certain length. For example, the segment is defined with a length of 32 bits, therefore there are 64 segments in a basic frame at maximum CPRI link rate of 9830.4 Mb/s, among which the first 4 segments are control word data and the rest 60 segments are IQ data. The first segment number starts from 1, the CPRI unit 104a keeps count of the segment numbers and provides the first segment number to the first timing and management logic unit 312.

The memory write signal is generated when the first CPRI unit has synchronized up to the downlink node in the chain, and the control word data in the auxiliary data in the first CPRI unit has been detected. In a preferred embodiment, the control word data in the auxiliary data is detected by comparing the number of a current segment in the auxiliary data with a predefined segment, wherein the predefined segment number is set as the number of segments in control word data in a basic frame, therefore if the first segment number is less than or equal to the predefined segment number, the current data is control word data.

At step 404, the control word data stored in the memory unit is read based on a second set of frame timing signals received from a second auxiliary interface of a second CPRI unit.

In a preferred embodiment, a memory read signal is generated based on the second set of frame timing signals to instruct reading the control word data from the memory unit.

In a preferred embodiment, the second set of frame timing signals comprises a second synchronization status signal for indicating that the second CPRI unit has synchronized up to the uplink node in the chain, and a second segment number indicating the number of the current segment in the second CPRI unit for detecting the control word data in the auxiliary data.

The memory read signal is generated when the second CPRI unit has synchronized up to the uplink node in the chain, and the control word data in the auxiliary data in the second CPRI unit has been detected. In a preferred embodiment, the control word data in the auxiliary data is detected by comparing the number of a current segment in the auxiliary data with a predefined segment, wherein the predefined segment number is set as the number of segments in control word data in a basic frame, therefore if the second segment number is less than or equal to the predefined segment number, the current data is control word data.

At step 406, the control word data read from the memory unit is merged with the IQ data in the auxiliary data received from the first auxiliary interface.

At step 408, the merged auxiliary data is transmitted to the second auxiliary interface.

The description of the preferred embodiments of the present invention has been presented for purposes of illustration and description, but is not intended to be exhaustive or to limit the invention to the forms disclosed. It will be appreciated by those skilled in the art that changes could be made to the embodiments described above without departing from the broad inventive concept thereof. It is understood, therefore, that this invention is not limited to the particular embodiment disclosed, but covers modifications within the spirit and scope of the present invention as defined by the appended claims.

The invention claimed is:

1. An transmission node for use in a chain in a wireless communication network, comprising:
   a first Common Public Radio Interface (CPRI) unit comprising a first auxiliary interface for transmitting auxiliary data to a second CPRI unit in the transmission node, wherein the auxiliary data comprises control word data and IQ data;
   a memory unit for storing the control word data;
   a memory write block connected between the first auxiliary interface and the memory unit for writing the control word data to the memory unit based on a first set of frame timing signals received from the first auxiliary interface; and
   a memory read and merge block connected to the memory unit for reading the control word data stored in the memory unit based on a second set of frame timing signals, and merging the control word data with the IQ data from the first auxiliary interface,
   wherein the second CPRI unit comprises a second auxiliary interface connected to the memory read and merge block for receiving the merged auxiliary data, and
   wherein the memory read and merge block comprises:
      a memory read interface connected to the memory unit for reading the control word data stored in the memory unit based on a memory read signal;
      a merge logic unit connected to the memory read interface and the first auxiliary interface for merging the control word data received from the memory read interface with the IQ data transmitted from the first auxiliary interface; and
      a second timing and management logic unit connected between the second auxiliary interface and the memory read interface for generating the memory read signal based on the second set of frame timing signals received from the second auxiliary interface.

2. The transmission node of claim 1, wherein the memory write block comprises:
   a memory write interface connected between the first auxiliary interface and the memory unit for writing the control word data to the memory unit based on a memory write signal; and
   a first timing and management logic unit connected between the first auxiliary interface and the memory write interface for receiving the first set of frame timing signals and generating the memory write signal based on the first set of frame timing signals.

3. The transmission node of claim 2, wherein the first set of frame timing signals comprises:
   a first synchronization status signal for indicating that the first CPRI unit has synchronized up to a downlink node in the chain; and
   a first segment number for detecting the control word data in the auxiliary data in the first CPRI unit.

4. The transmission node of claim 3, wherein the first timing and management logic unit instructs the memory write interface to write the control data to the memory unit with the memory write signal when the first CPRI unit has synchronized with the downlink node in the chain, and the control word data in the auxiliary data has been detected.

5. The transmission node of claim 1, wherein the second set of frame timing signals comprises:
   a second synchronization status signal for indicating that the second CPRI unit has synchronized with an uplink node in the chain; and
   a second segment number for detecting the control word data in the auxiliary data.

6. The transmission node of claim 5, wherein the second timing and management logic unit instructs the memory read interface to read the control data from the memory unit with the memory read signal when the second CPRI unit has synchronized with the uplink node in the chain, and the control data in the auxiliary data has been detected.

7. The transmission node of claim 1, wherein the memory unit comprises a plurality of registers arranged as a dual port FIFO stack.

8. A method of operating a transmission node for use in a chain in a wireless communication network, comprising:
   writing control word data in auxiliary data transmitted from a first auxiliary interface of a first Common Public Radio Interface (CPRI) unit to a memory unit based on a first set of frame timing signals received from the first auxiliary interface, wherein the auxiliary data comprises the control word data and IQ data;
   reading the control word data stored in the memory unit based on a second set of frame timing signals received from a second auxiliary interface of a second CPRI unit in the transmission node;
   merging the control word data read from the memory unit with the IQ data received from the first auxiliary interface; and
   transmitting the merged auxiliary data to the second auxiliary interface, wherein a memory read signal is generated based on the second set of frame timing signals to instruct reading the control word data from the memory unit.

9. The method of claim 8, wherein a memory write signal is generated based on the first set of frame timing signals to instruct writing the control word data to the memory unit.

10. The method of claim 9, wherein the first set of frame timing signals comprises:
   a first synchronization status signal for indicating that the first CPRI unit has synchronized up to a downlink node in the chain; and
   a first segment number for detecting the control word data in the auxiliary data, wherein the memory write signal is generated when the first CPRI unit has synchronized up to the downlink node in the chain, and the control word data in the auxiliary data has been detected.

11. The method of claim 8, wherein the second set of frame timing signals comprises:
   a second synchronization status signal for indicating that the second CPRI unit has synchronized to an uplink node in the chain; and
   a second segment number for detecting the control word data in the auxiliary data, wherein the memory read signal is generated when the second CPRI unit has synchronized to the uplink node in the chain, and the control data in the auxiliary data has been detected.

12. The method of claim 8, wherein the memory unit comprises a plurality of registers arranged as a dual port FIFO stack.

* * * * *